United States Patent
Hovden et al.

(10) Patent No.: US 12,498,336 B2
(45) Date of Patent: Dec. 16, 2025

(54) RECOVERING ATOMIC-SCALE CHEMISTRY FROM FUSED MULTI-MODAL ELECTRON MICROSCOPY

(71) Applicants: THE REGENTS OF THE UNIVERSITY OF MICHIGAN, Ann Arbor, MI (US); UCHICAGO ARGONNE, LLC, Chicago, IL (US); DOW GLOBAL TECHNOLOGIES LLC, Midland, MI (US)

(72) Inventors: Robert Hovden, Ann Arbor, MI (US); Jonathan Schwartz, Ann Arbor, MI (US); Yi Jiang, Lemont, IL (US); Zichao Wendy Di, Darien, IL (US); Steven J. Rozeveld, Midland, MI (US); Huihuo Zheng, Glen Ellyn, IL (US)

(73) Assignees: THE REGENTS OF THE UNIVERSITY OF MICHIGAN, Ann Arbor, MI (US); UCHICAGO ARGONNE, LLC, Chicago, IL (US); DOW GLOBAL TECHNOLOGIES LLC, Midland, MI (US)

( * ) Notice: Subject to any disclaimer, the term of this patent is extended or adjusted under 35 U.S.C. 154(b) by 602 days.

(21) Appl. No.: 17/875,333

(22) Filed: Jul. 27, 2022

(65) Prior Publication Data

US 2023/0044062 A1   Feb. 9, 2023

Related U.S. Application Data

(60) Provisional application No. 63/203,671, filed on Jul. 27, 2021.

(51) Int. Cl.
  *G01N 23/2251* (2018.01)
  *G01N 23/046* (2018.01)
  *H01J 37/28* (2006.01)

(52) U.S. Cl.
  CPC ....... *G01N 23/2251* (2013.01); *G01N 23/046* (2013.01); *H01J 37/28* (2013.01); *H01J 2237/2802* (2013.01)

(58) Field of Classification Search
  USPC ....................................................... 250/305
  See application file for complete search history.

(56) References Cited

U.S. PATENT DOCUMENTS 9,312,098 B2   4/2016   Lazic et al.
9,831,061 B2   11/2017  Sang et al.
(Continued)

FOREIGN PATENT DOCUMENTS

CN   109523599 A   3/2019
WO   2020/239115 A1  12/2020

OTHER PUBLICATIONS

Beck et al., Fast gradient-based algorithms for constrained total variation image denoising and deblurring problems, IEEE Trans Image Process., 18(11):2419-2434 (Nov. 2009).
(Continued)

*Primary Examiner* — Kiet T Nguyen
(74) *Attorney, Agent, or Firm* — MARSHALL, GERSTEIN & BORUN LLP

(57) ABSTRACT

Systems and methods for fused multi-modal electron microscopy are provided to generate quantitatively accurate 2D maps or 3D volumes with pixel/voxel values that directly reflect a sample's chemistry. Techniques are provided for combining annular dark field detector (ADF), annular bright field (ABF) and/or pixelated detector image data and energy dispersive X-rays (EDX) data and/or electron energy loss spectroscopy (EELS) data for a sample and generating chemical 2D and 3D maps by applying minimization optimization process.

11 Claims, 10 Drawing Sheets
(7 of 10 Drawing Sheet(s) Filed in Color)

(56) References Cited

U.S. PATENT DOCUMENTS 10,541,111 B2    1/2020    Konyuba et al.
2012/0237138 A1*    9/2012    Potapov ............... G01N 23/225
                                                                                   382/302

OTHER PUBLICATIONS

Calhoun et al., Multimodal fusion of brain imaging data: A key to finding the missing link(s) in complex mental illness, Biol Psychiatry Cogn Neurosci Neuroimaging., 1(3):230-244 (May 2016).
Candes et al., Robust uncertainty principles: exact signal reconstruction from highly incomplete frequency information, IEEE Transactions on Information Theory, 52(2):489-509 (Feb. 2006).
Crewe et al., Visibility of Single Atoms, Science, 168(3937):1338-1340 (Jun. 1970).
Cueva et al., Data processing for atomic resolution electron energy loss spectroscopy, Microsc Microanal., 18(4):667-675 (Aug. 2012).
D'Alfonso et al., Atomic-resolution chemical mapping using energy-dispersive x-ray spectroscopy, Phys. Rev. B, 81(10):100101R (Mar. 2010).
Donoho D.L., Compressed sensing, IEEE Transactions on Information Theory, 52(4):1289-1306 (Apr. 2006).
Dupe et al., A Proximal Iteration for Deconvolving Poisson Noisy Images Using Sparse Representations, IEEE Transactions on Image Processing, 18(2):310-321 (Feb. 2009).
Egerton et al., Characterization of an analytical electron microscope with a NiO test specimen, Ultramicroscopy, 55(1):43-54 (Jul. 1994).
Egerton R. F., Formulae for light-element micro analysis by electron energy-loss spectrometry, Ultramicroscopy, 3:243-251 (1978).
Findlay et al., Dynamics of annular bright field imaging in scanning transmission electron microscopy, Ultramicroscopy, 110(7):903-923 (Jun. 2010).
Ha et al., Estimating the spectrum in computed tomography via Kullback-Leibler divergence constrained optimization, Medical Physics, 46(1):81-92 (Jan. 2019).
Ha et al., Solid-solid phase transformations induced through cation exchange and strain in 2D heterostructured copper sulfide nanocrystals, Nano Letters, 14(12):7090-7099 (Dec. 2014).
Hall et al., An introduction to multisensor data fusion, Proceedings of the IEEE, 85(1):6-23 (Jan. 1997).
Hart et al., Direct Detection Electron Energy-Loss Spectroscopy: A Method to Push the Limits of Resolution and Sensitivity, Scientific Reports, 7(8243):1-14 (Aug. 2017).
Hartel et al., Conditions and reasons for incoherent imaging in STEM, Ultramicroscopy, 63(2):93-114 (Jun. 1996).
Hofer et al., Application of EELS to the microanalysis of materials, Microchimica Acta, 91:125-134 (Jan. 1987).
Hofer F., EELS quantification of M edges by using oxidic standards, Ultramicroscopy, 21(1):63-68 (1987).
Hovden et al., Efficient elastic imaging of single atoms on ultrathin supports in a scanning transmission electron microscope, Ultramicroscopy, 123:59-65 (Dec. 2012).
Huber et al., Total generalized variation regularization for multi-modal electron tomography, Nanoscale, 11(12):5617-5632 (Feb. 2019).
Kang et al., Enhanced supercapacitor performance of $MnO_2$ by atomic doping, Angewandte Chemie International Edition, 52(6):1664-1667 (Feb. 2013).
Kothleitner et al., Quantitative Elemental Mapping at Atomic Resolution Using X-Ray Spectroscopy, Physical Review Letters, 112:085501(1-5) (Feb. 2014).
Krivanek et al., Atom-by-atom structural and chemical analysis by annular dark-field electron microscopy, Nature, 464:571-574 (Mar. 2010).
Lahat et al., Multimodal Data Fusion: An Overview of Methods, Challenges, and Prospects, Proceedings of the IEEE, 103(9):1449-1477 (Sep. 2015).
Lai et al., Direct growth of high-rate capability and high capacity copper sulfidenanowire array cathodes for lithium-ion batteries, J. Mater. Chem., 20(32):6638-6645 (Jun. 2010).
Langmore et al., The collection of scattered electrons in dark-field electron microscopy, Optik, 38:335-350 (Sep. 1973).
Muller et al., Atomic-scale chemical imaging of composition and bonding by aberration-corrected microscopy, Science, 319(5866):1073-1076 (Feb. 2008).
Odstrcil et al., Alignment methods for nanotomography with deep subpixel accuracy, Opt Express., 27(25):36637-36652 (Dec. 2019).
Perera et al., Enhanced Supercapacitor Performance for Equal Co—Mn Stoichiometry in Colloidal Co $3-x$ Mn $x$ O 4 Nanoparticles, in Additive-Free Electrodes, Chemistry of Materials, 27(33):7861-7873 (Nov. 2015).
Rez P. Cross-sections for energy loss spectrometry, Ultramicroscopy, 9(3):283-287 (1982).
Rozeveld et al., Characterization of Cobalt Sulfide Catalysts, Microscopy and Microanalysis, 26(S2):1248-1250 (Jul. 2020).
Rudin et al., Nonlinear total variation based noise removal algorithms, Physica D: Nonlinear Phenomena, 60(1-4):259-268 (Nov. 1992).
Savitzky et al., Bending and breaking of stripes in a charge ordered manganite, Nature Communications, 8(1883):1-6 (Dec. 2017).
Schlossmacher et al., Enhanced Detection Sensitivity with a New Windowless XEDS System for AEM Based on Silicon Drift Detector Technology, Microsc. Today, 18:14-20 (2010).
Spence et al., Stem microanalysis by transmission electron energy loss spectroscopy in crystals, Ultramicroscopy, 9(3):267-276 (1992).
Su et al., Multi-dimensional correlative imaging of subcellular events: combining the strengths of light and electron microscopy, Biophys Rev.,, 2(3):121-135 (Jul. 2010).
Wu et al., Synthesis and photovoltaic application of copper(I) sulfide nanocrystals, Nano Letters, 8(8):2551-2555 (Aug. 2008).
Xia et al., Self-supported hydrothermal synthesized hollow $Co_3O_4$ nanowire arrays with high supercapacitor capacitance, J. Mater. Chem., 21(25):9319-9325 (2011).

* cited by examiner

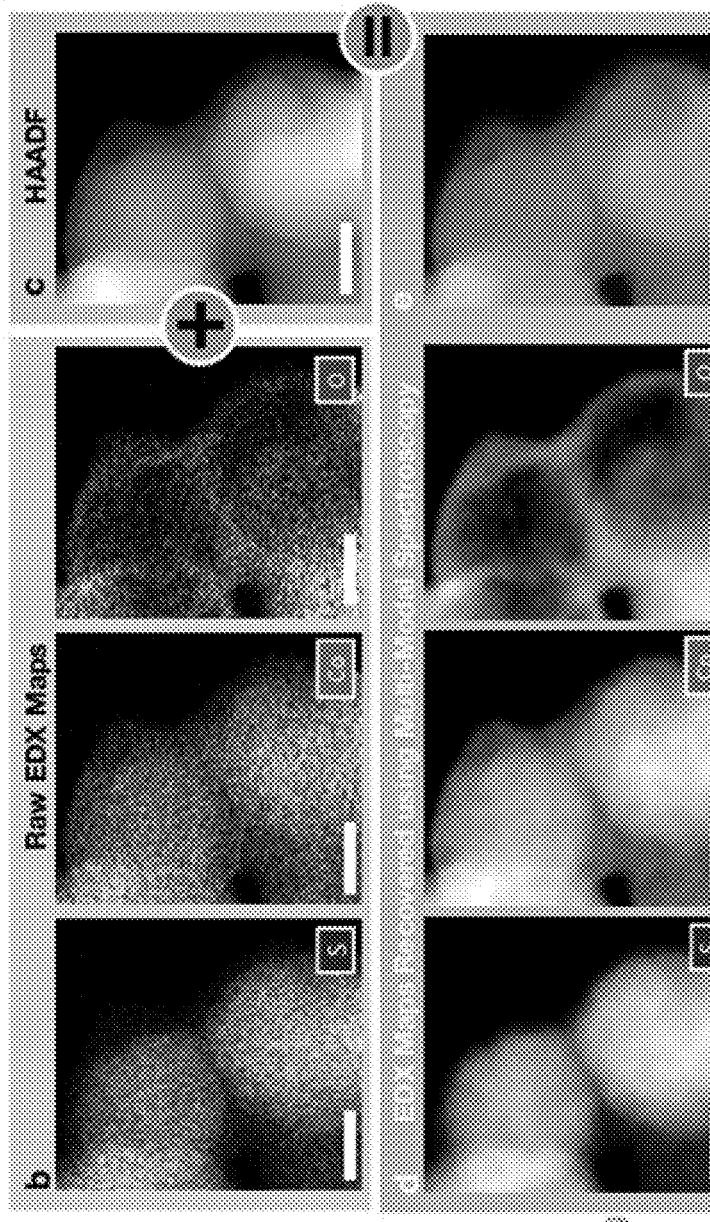
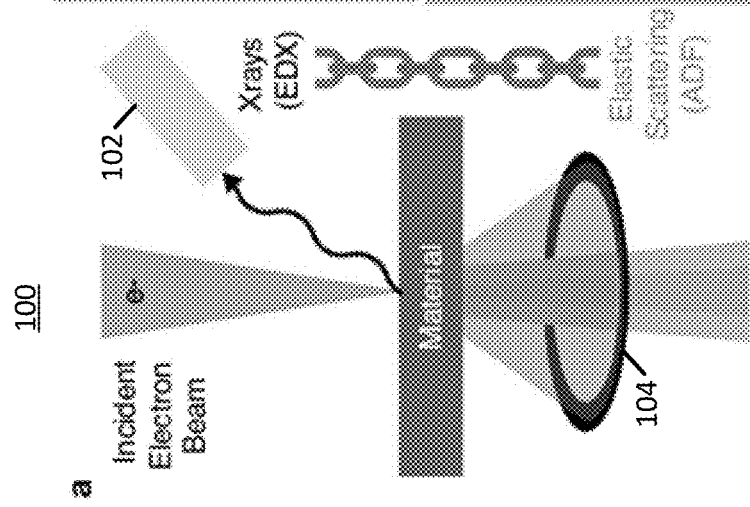

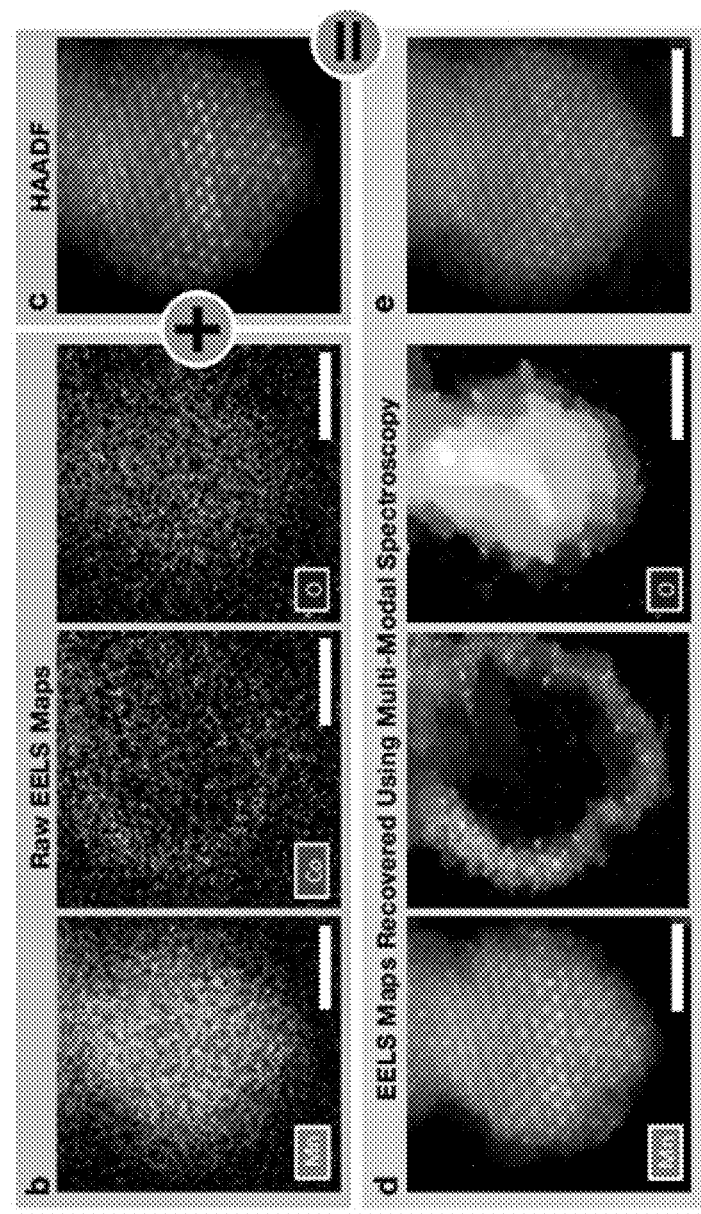
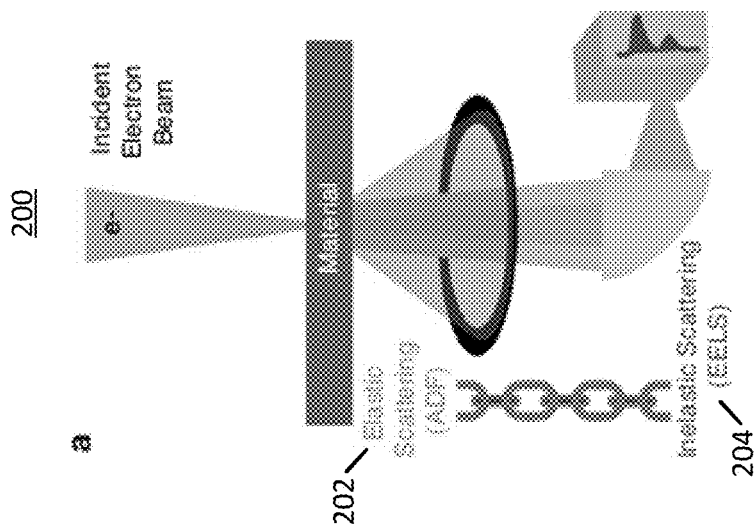

FIG. 3A 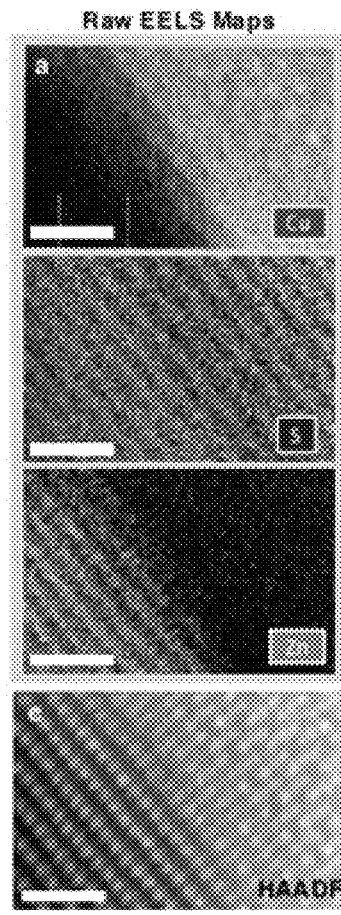 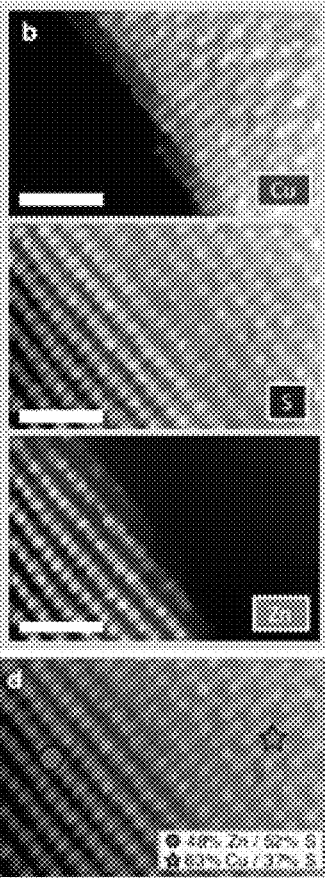 FIG. 3B
FIG. 3C 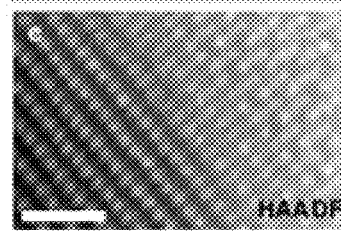 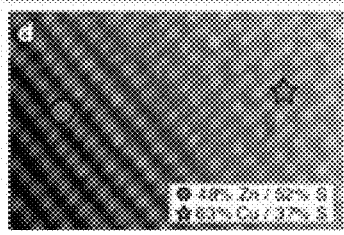 FIG. 3D
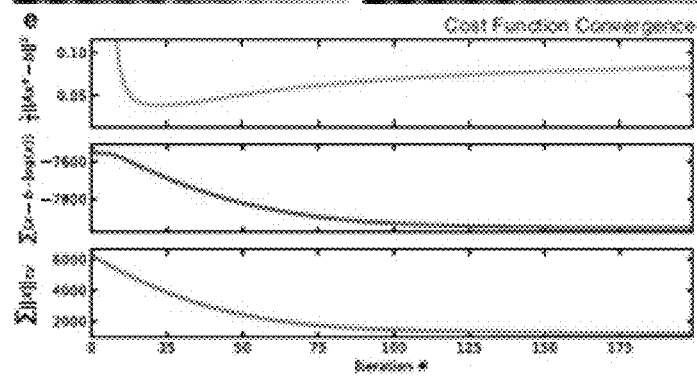
FIG. 3E

FIG. 4A
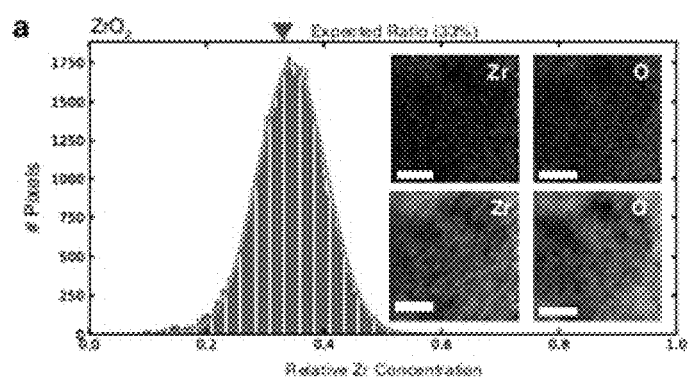
FIG. 4B
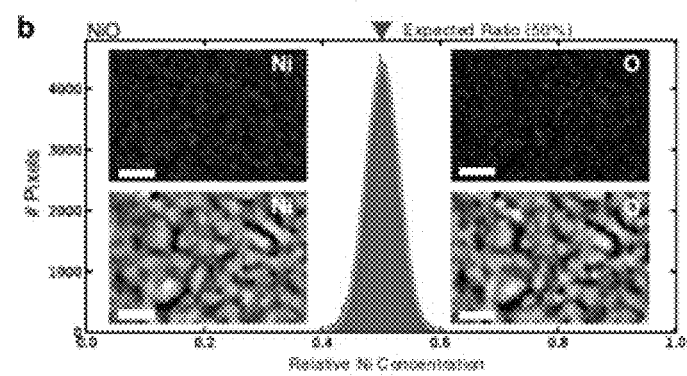
FIG. 4C
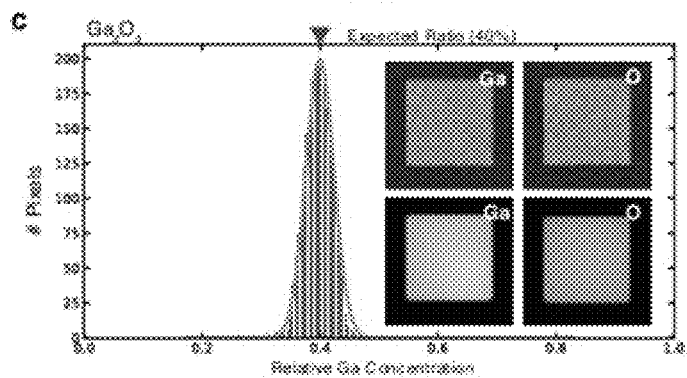
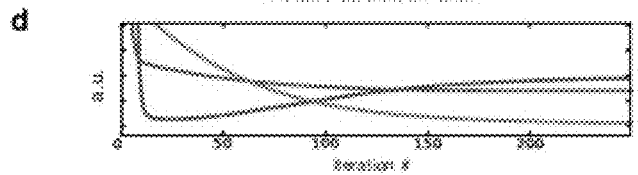
FIG. 4D

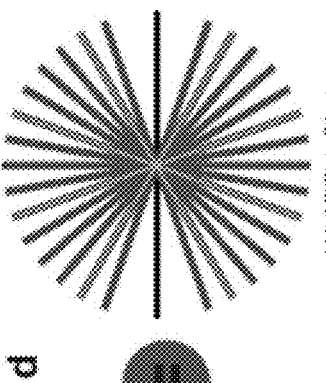
FIG. 8A FIG. 8B FIG. 8C FIG. 8D
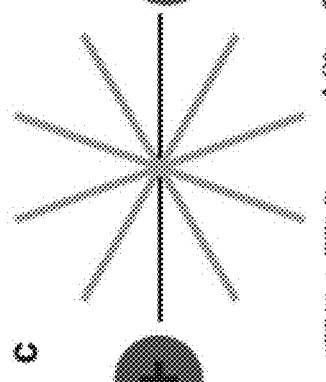
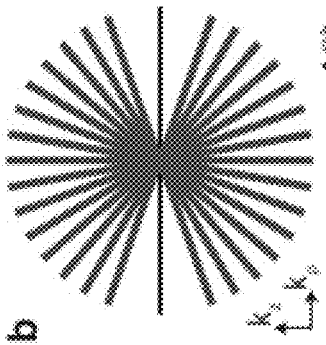
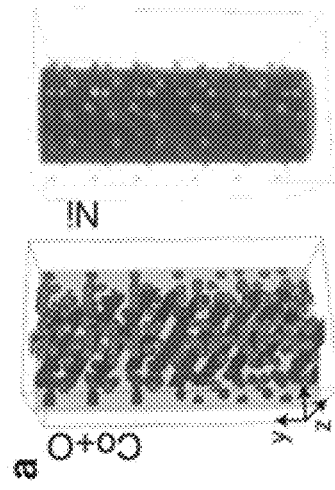

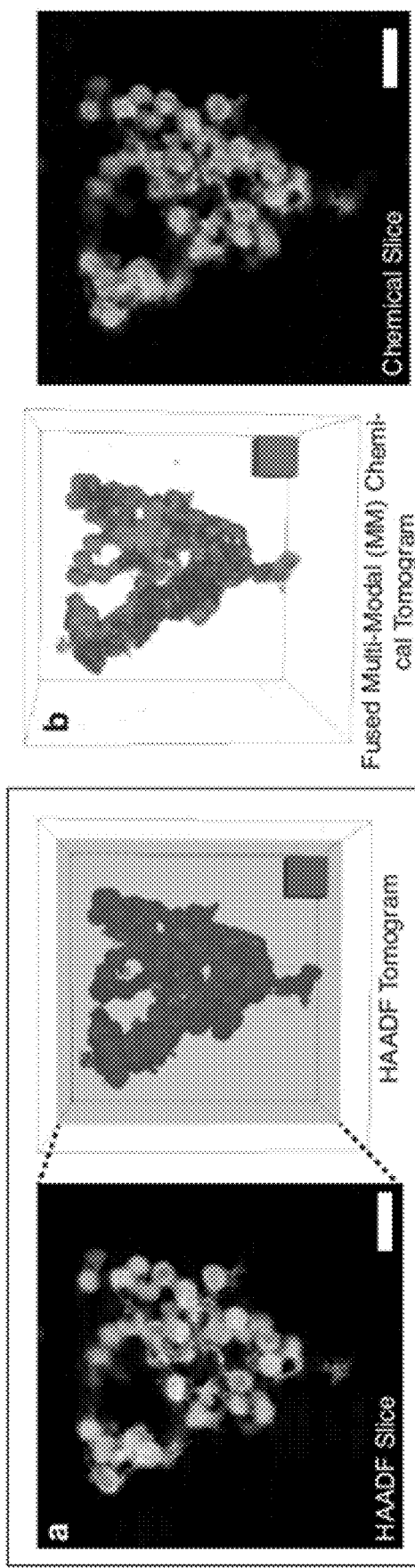
FIG. 9A
FIG. 9B
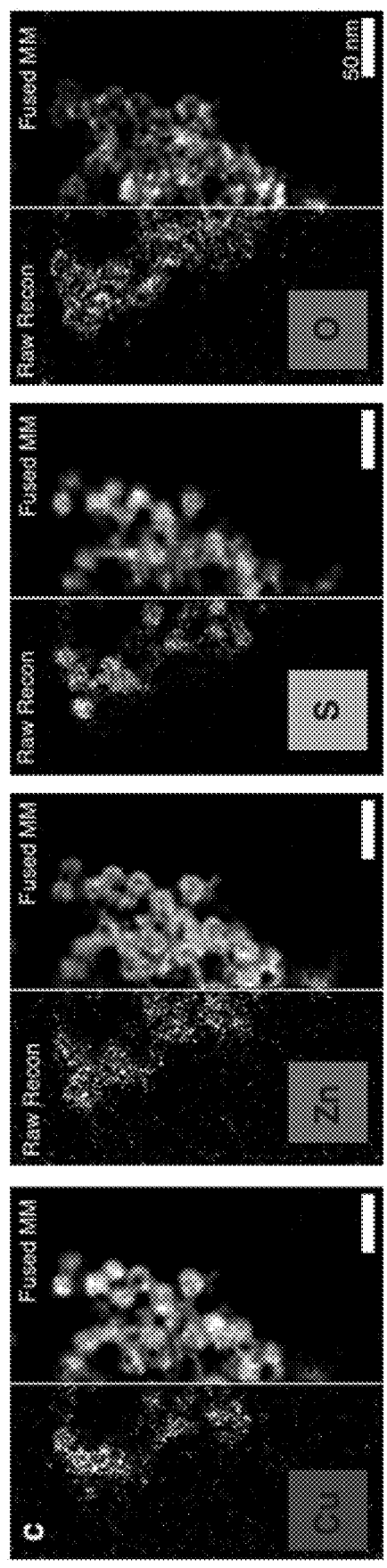
FIG. 9C

RECOVERING ATOMIC-SCALE CHEMISTRY FROM FUSED MULTI-MODAL ELECTRON MICROSCOPY

CROSS-REFERENCE TO RELATED APPLICATIONS

This application claims priority to U.S. Provisional Patent Application No. 63/203,671, filed Jul. 27, 2021, which is hereby incorporated by reference in its entirety.

STATEMENT OF GOVERNMENT SUPPORT

This invention was made with government support under Contract DE-AC02-06CH11357 awarded by the Department of Energy to UChicago Argonne, LLC, Operator of Argonne National Laboratory. The government has certain rights in the invention.

BACKGROUND

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

Modern electron microscopes can focus sub-angstrom electron beams on and between atoms to quantify structure and chemistry in real space from elastic and inelastic scattering processes. Reliable interpretation of atomic structure at higher-signal-to-noise ratio (SNR) is provided by elastically scattered electrons collected in an annular detector (e.g. an annular dark field (ADF) or an annular bright field (ABF)) or pixelated detector (PD), however this signal under-describes the chemistry. The chemical composition of specimens is revealed by spectroscopic techniques produced from inelastic interactions in the form of energy dispersive X-rays (EDX) or electron energy loss spectroscopy (EELS). From these signals, or modalities, each atom's chemical identity and coordination provides essential information about the performance of nanomaterials across a wide range of applications from clean energy, batteries, and opto-electronics, among many others. Unfortunately, high-resolution chemical imaging often exceeds the dose limits of a specimen-chemical maps are noisy or missing entirely. Dose limits force a tradeoff between SNR, resolution, and the materials that can be imaged.

In conventional techniques, the signal from each detector—such as ADF and EDX/EELS—are analyzed separately and correlated to provide insight to structural, chemical, or optical properties by overlaying information acquired from multiple detectors. However, correlative imaging disregards the shared information between structure and chemistry and misses an opportunity to recover useful information. In some examples, data fusion techniques go further than correlative imaging by linking the separate signals collected during an experiment to reconstruct new information or improve measurement accuracy. Successful data fusion designs an analytical model that faithfully represents the relationship between modalities, and yields a meaningful combination without imposing any artificial connections.

Spectroscopic experiments simultaneously collect multiple modalities where each signal is acquired with different SNRs. ADF micrographs contain contrast proportional to the atomic number (Z) via Rutherford scattering producing images with high SNR at lower doses (e.g., $10^3$ e/Å$^2$). Unfortunately, Z-contrast imaging can only distinguish well separated atoms with noticeably different atomic numbers. Spectral images are usually severely degraded by higher noise than ADF signals and high radiation doses are required (e.g. >$10^6$ e/Å$^2$). ABF and pixelated detectors can also provide Z-contrast imaging of light elements over a range of specimen thicknesses. More reliable interpretation of material chemistry is needed, e.g., by linking these inelastic and elastic modalities.

Electron tomography extends the capabilities of an electron microscope into three dimensional (3D) imaging by collecting many two dimensional (2D) projections of the specimen across an angular range by rotating the specimen. Unlike 2D imaging, electron tomography is an underdetermined problem, which means it requires reconstruction algorithms to best estimate the true 3D specimen structure. In principle, when used in combination with energy dispersive X-ray (EDX) or electron energy loss (EELS) spectroscopy, electron tomography can characterize complex three-dimensional (3D) material chemistry at the nanoscale. However in practice, chemical tomography demands significantly high electron doses that almost always exceed the specimen limits (e.g. >$10^7$ e/Å$^2$). At best, investigators choose between measuring 3D structure with annular dark field detector (ADF) tomography or characterizing chemistry along a single viewing direction. Reliable 3D chemical reconstructions of specimens is needed, e.g. by linking inelastic (EDX and/or EELS) and elastic modalities (ADF and/or ABF and/or pixelated detector) in the reconstruction process.

SUMMARY

The present application describes fused multi-modal electron microscopy techniques that offer high signal-to-noise ratio (SNR) recovery of material chemistry by leveraging correlated information encoded within both annular or pixelated detector data and energy dispersive X-rays (EDX) data and/or electron energy loss spectroscopy (EELS) data. The techniques herein are able to recover chemical maps (in the form of image data or other map data) by reformulating the inverse problem as a numerical optimization that seeks solutions that surpass traditional dose limits. The techniques herein are able to substantially improve SNRs for chemical maps, by around 300-500% in various examples, while remaining consistent with original measurements. We demonstrate on a diverse set of EDX/EELS datasets at high-resolution for nanoparticle catalysts and supercapacitors. Moreover, the fused multi-modal electron microscopy techniques herein are able to recover a specimen's relative concentration, allowing researchers to measure local stoichiometry within <15% error. Convergence and uncertainty estimates are identified along with simulations providing ground-truth assessment of error.

In an embodiment, A method for chemical sample imaging is provided, the method including: receiving energy dispersive X-ray (EDX) image data corresponding to a chemical sample, the EDX image data containing one or more measured chemical maps; receiving annular dark field (ADF) image data or annular bright field (ABF) or pixelated detector (PD) image data corresponding to the chemical sample; correlating the EDX image data and the ADF image data or the ABF image data or the PD image data using an optimization process that performs a minimization between each of the EDX image data and the ADF image data or the ABF image data or the PD image data and one or more recovered chemical maps of the chemical sample; and in response to the optimization process, generating and displaying and/or storing the one or more recovered chemical maps corresponding to the chemical sample.

In another embodiment, a method for chemical sample imaging is provided, the method including: receiving electron energy loss spectroscopy (EELS) image data corresponding to a chemical sample, the EDX image data containing one or more measured chemical maps corresponding to the chemical sample; receiving annular dark field (ADF) image data or annular bright field (ABF) or pixelated detector (PD) image data corresponding to the chemical sample; correlating the EELS image data and the ADF image data or the ABF image data or the PD image data using an optimization process that performs a minimization between each of the EELS image data and the ADF image data or the ABF image data or the PD image data and one or more recovered chemical maps of the chemical sample; and in response to the optimization process, generating and displaying and/or storing the one or more recovered chemical maps corresponding to the chemical sample.

In an example, the optimization process comprises the following optimization:

$$\operatorname*{argmin}_{x} \frac{\lambda_1}{2} \left\| b_H - \sum_i (Z_i x_i)^{\gamma} \right\|_2^2 + \gamma_2 \sum_i (x_i - b_i \log(x_i)) + \lambda_3 \sum_i \|x_i\|_{TV}$$

where $b_H$ is the annular or pixelated detector image data, $\lambda_i$ are weighting coefficients, $b_i$ and $x_i$ are the measured chemical maps and recovered chemical maps, respectively, and TV is channel-wise total variation regularization.

In an example, the optimization process comprises the following optimization:

$$\operatorname*{argmin}_{x} \frac{\lambda_1}{2} \left\| b_H - \sum_i (Z_i x_i)^{\gamma} \right\|_2^2 + \frac{\lambda_2}{2} \|b_i - x_i\|_2^2 + \lambda_3 \sum_i \|x_i\|_{TV}$$

where $b_H$ is the annular or pixelated detector image data, $\lambda_i$ are weighting coefficients, $b_i$ and $x_i$ are the measured chemical maps and recovered chemical maps, respectively, and TV is channel-wise total variation regularization.

In an example, the optimization process comprises the following optimization:

$$\hat{x} =$$

$$\operatorname*{argmin}_{x} \frac{\lambda_1}{2} \left\| A_h \sum_i (Z_i x_i)^{\gamma} - b_h \right\|_2^2 + \lambda_2 \sum_i (A_c x_i - b_i \log(A_c x_i)) + \lambda_3 \sum_i \|x_i\|_{TV}$$

where $b_h$ is the annular or pixelated detector image data across a range of specimen projection angles, $A_h$ and $A_c$ are forward projection operators for the annular detector image data and chemical maps, A are weighting coefficients, $b_i$ is the measured chemical image data across a range of specimen projection angles, and $x_i$ is the recovered chemical volume for element i, respectively.

In an example, the optimization process comprises the following optimization:

$$\operatorname*{argmin}_{x} \frac{\lambda_1}{2} \left\| A_h \sum_i (Z_i x_i)^{\gamma} - b_h \right\|_2^2 + \lambda_2 \|A_c x_i - b_i \log(A_c x_i)\|_2^2 + \lambda_3 \sum_i \|x_i\|_{TV}$$

where $b_h$ is the annular or pixelated detector image data, $A_h$ and $A_c$ are forward projection operators for the annular detector image data and chemical tilts, $\lambda$ are regularization parameters, $b_i$ and $x_i$ are the measured and recovered chemical maps for element i, respectively.

In an example, the EDX image data comprises measured chemical maps of a plurality of different chemical compounds.

In an example, the EELS image data comprises measured chemical maps of a plurality of different chemical compounds.

In an example, the chemical maps may be 2D or 3D chemical maps. Further, in an example, generating and displaying and/or storing the one or more recovered chemical maps comprises: overlaying the measured chemical maps on the recovered chemical maps wherein EDX image data comprises chemical maps of a plurality of different chemical compounds.

In an example, the EDX image data or EELS image data comprises a plurality of measured chemical maps and a plurality of recovered chemical maps are generated, the method further includes: determining a stoichiometric concentration of the chemical sample by comparing the plurality of recovered chemical maps to one another, of the plurality of recovered chemical maps corresponding to a different chemical composition; and determining a concentration of each of the different chemical compositions.

In accordance with another example, a method for chemical sample imaging, the method includes: receiving electron energy loss spectroscopy (EELS) and receiving energy dispersive X-ray (EDX) image data image data corresponding to a chemical sample, the EDX and EELS image data containing one or more measured chemical maps corresponding to the chemical sample; receiving annular dark field (ADF) image data and/or annular bright field (ABF) and/or pixelated detector (PD) image data corresponding to the chemical sample; correlating the EELS image data, the EDX image data and the ADF or ABF or PD image data using an optimization process that performs a minimization between each of the EELS and EDX image data and the ADF or ABF image data and one or more recovered chemical maps of the chemical sample; and in response to the optimization process, generating and displaying and/or storing the one or more recovered chemical maps corresponding to the chemical sample.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a more complete understanding of the disclosure, reference should be made to the following detailed description and accompanying drawing figures, in which like reference numerals identify like elements in the figures, and in which:

FIG. 1A illustrates a schematic of a fused multi-modal electron microscopy system used for nano-scale chemical map recovery of CoS using an EDX modality and ADF modality, in accordance with an example. FIG. 1B are raw EDX chemical maps for the Co, S, and O elemental distributions. FIG. 1C is a simultaneous ADF micrograph of the CoS nanoparticle. FIG. 1D are the multi-modal reconstructions for the elemental distributions, using the fused multi-modal electron microscopy system of FIG. 1A. FIG. 1E is an EDX overlay of the Co, S, and O maps, generated by the fused multi-modal electron microscopy system of FIG. 1A (showing with a scale bar 30 nm).

FIG. 2A illustrates a schematic of a fused multi-modal electron microscopy system used for nano-scale chemical map recovery using an EELS modality and ADF modality, in accordance with an example. FIG. 2B are images of raw EELS maps for elemental distributions of Co, $Mn-L_{2,3}$, and O-K edges. FIG. 2C is a simultaneous ADF micrograph of the $CO_{3-z}Mn_zO_4$ nanoparticle. FIG. 2D are the multi-modal reconstructions for the elemental distributions, using the fused multi-modal electron microscopy system of FIG. 2A. FIG. 2E is an EELS overlay of the Co, Mn, and O maps, generated by the fused multi-modal electron microscopy system of FIG. 2A (showing with a scale bar 2 nm).

FIG. 3A are EELS maps for Cu, S, and Zn $L_{2,3}$ edges, in accordance with an example. FIG. 3B are multi-modal reconstructions for the element compositions using a fused multi-modal electron microscopy system. FIG. 3C is a simultaneous ADF micrograph of the $ZnS-Cu_{1.81}S$ interface. FIG. 3D is an EELS overlay of the Zn, S, and Zn maps generated by a fused multi-modal electron microscopy system. FIG. 3E are convergence plots for the three individual components in the cost function (scale bar 1 nm).

FIG. 4A is a pixel intensity histogram for an Zr concentration map, in accordance with an example and showing raw EDX map and reconstructions (scale bar 10 nm). FIG. 4B is a pixel intensity histogram of the Ni concentration map (scale bar 5 nm). FIG. 4C is a pixel intensity histogram of the Ga concentration map. FIG. 4D are convergence plots for three components of a cost function: (red) model based term, (blue) data fidelity, and (green) regularization.

FIG. 8A illustrates the Co+O and Ni 3D test phantoms with 2D slices visualized below the tomograms. FIGS. 8B and 8C illustrated illustrate the ADF and chemical (Co+O, Ni) reconstructions, respectively, from their corresponding theoretical sampling measurement in Fourier space. FIG. 8D illustrates the recovered chemical tomograms and a visualization of data fusion in Fourier space. Multi-modal tomography dramatically improves 3D chemical reconstruction quality, as shown.

FIG. 9A illustrates a fused multi-modal electron tomography on ZnS/CuS nanoparticles, showing a ADF tomogram reconstruction with a 2D slice shown on the left. FIG. 9B illustrates the fused multi-modal tomography reconstruction illustrating CuS or ZnS rich nanoparticles and oxidized shells. FIG. 9C illustrates 2D slices of the chemical reconstructions for Cu, Zn, S, and O, with the noisy traditional reconstructions highlighted on the left of each image.

DETAILED DESCRIPTION

Figure 5A:
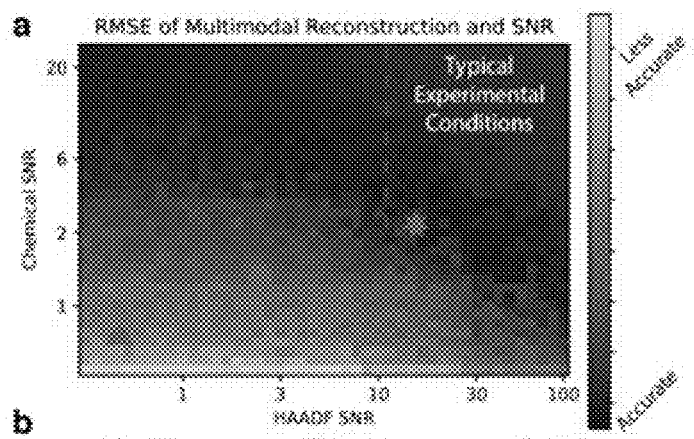
FIG. 5A is a phase diagram representing the reconstruction error as a function of multipole spectroscopic and ADF SNR.

The present application describes systems and methods that address the shortcomings of the art by using a model-driven data fusion algorithm that substantially improves the quality of electron microscopy chemical mapping in 2D and 3D. As we highlight on both synthetic and experimental datasets, with the present techniques, multi-modal electron microscopy generates quantitatively accurate 2D maps or 3D volumes with pixel/voxel values that directly reflect the materials chemistry. The techniques open new pathways for low-dose chemical imaging in 2D or 3D. For example, applications are now available where all scattered signals can be collected and used in a meaningful way. Whether via integration through pixel array detectors and/or spectroscopic methods, fused multi-modal spectroscopy techniques herein provide for linking data to increase the utility of all detected information.

In various examples, the systems and methods are described for providing electron microscopy that uses multiple modes, termed herein multi-modal electron microscopy. Systems and methods are provided for fused multi-modal electron microscopy that recovers chemical maps (e.g., in the form of image data or other map data) by instituting an optimization process. In particular, in various examples, the systems and methods recover chemical maps by solving an optimization problem seeking a solution (i.e. chemical maps) that strongly correlates with three objectives: (1) a model based comparison of the chemical maps with the measured annular or pixelated detector modality (2) the recovered chemical maps retain consistency with the measured spectroscopic modality (EELS and/or EDX), and (3) the solution favors sparse structure in gradient or image domain. Thus, the systems and methods are able to resolve an optimization problem with a model based relationship between the SNR limited and rich signals, where the recovered solution retains consistency with the original measurements defined by its noise statistics and is maximally sparse in the gradient domain. In various examples, systems and methods are described for fused multi-modal electron microscopy techniques that combine both annular dark field detector (ADF) and/or annular bright field detector (ABF) and/or pixelated detector data and energy dispersive X-rays (EDX) data and/or electron energy loss spectroscopy (EELS) data for generating chemical 2D and 3D maps. Examples of ADF techniques include high-angle, medium-angle, and low-angle ADF. Further while various examples are described and illustrated in reference to ADF signal data, such references are meant to include the use of annular bright field (ABF) and pixelated detector signal data. These signals can come directly from annular detectors or integrated signals on a pixelated detector (e.g. Segmented Annular Detectors, charged coupled devices (CCD), complementary metal-oxide semiconductor (CMOS) devices, or pixel array detectors (PAD)).

As used herein a "chemical map" refers to chemical image data in the context of 2D measurement or chemical volumetric data in the context of 3D tomographic measurement.

In optimization process may be implemented in various ways to establish a fused multi-model approach. In an example, the overall optimization function is:

$$\underset{x}{\mathrm{argmin}} \frac{1}{2} \left\| b_H - \sum_i (Zx_i)^{\gamma} \right\|_2^2 + \sum_i (x_i - b_i \log(x_i)) + \sum_i \|x_i\|_{TV} \quad \text{(Eq. 1)}$$

where $b_H$ is the measured annular detector, $b_i$ is the measured chemical maps for element i, and $x_i$ is the reconstructed chemical maps. Z is a weighting for each element, typically corresponding to the element's atomic number, and $\gamma$ is a number typically between 1.33 and 2 (but not limited to this range). The choice of Z and $\gamma$ values are chosen to best model the electron scattering. TV is channel-wise total variation minimization (also referred to as the "regularization" term). Reducing the total variation (TV) of the image smooths the image in a way that maximizes sparsity in the gradient domain. In another example, example optimization function herein is:

$$\underset{x}{\mathrm{argmin}} \frac{\lambda_1}{2} \left\| b_H - \sum_i (Z_i x_i)^{\gamma} \right\|_2^2 + \lambda_2 \sum_i (x_i - b_i \log(x_i)) + \lambda_3 \sum_i \|x_i\|_{TV} \quad \text{(Eq. 2)}$$

where $b_H$ is the annular or pixelated detector image data, $\lambda_i$ are weighting coefficients, $b_i$ and $x_i$ are the measured chemical maps and recovered chemical maps, respectively, and TV is channel-wise total variation regularization. Yet another example optimization function is:

$$\underset{x}{\mathrm{argmin}} \frac{\lambda_1}{2} \left\| b_H - \sum_i (Z_i x_i)^{\gamma} \right\|_2^2 + \frac{\lambda_2}{2} \|b_i - x_i\|_2^2 + \lambda_3 \sum_i \|x_i\|_{TV} \quad \text{(Eq. 3)}$$

where $b_H$ is the annular or pixelated detector image data, $\lambda_i$ are weighting coefficients, $b_i$ and $x_i$ are the measured chemical maps and recovered chemical maps, respectively, and TV is channel-wise total variation regularization.

For various techniques herein, these three optimization functions define a multi-modal approach capable of surpassing traditional dose limits for chemical imaging. In various examples, a number of heuristics were applied as part of the techniques. First, we assumed a forward model where the simultaneous annular detector is the linear combination of elemental distributions. This incoherent linear imaging approximation for elastic scattering scales as $Z^{\gamma}$ where gamma is typically between 1.33 and 2 for ADF. Second, we ensured the recovered signals maintain a high-degree of data fidelity with the initial measurements by using maximum negative log-likelihood for spectroscopic measurements dominated by low-count Poisson statistics. In a higher count regime, this term can could be substituted with a simple least-squares error. Lastly, we utilized channel-wise total variation (TV) regularization to enforce a sparse gradient magnitude, which reduces noise and promotes image smoothness. Further, in various examples, each of these three terms can be weighted by a different coefficient that ensures accurate convergence of the optimization problem. Terms in the optimization function can be removed by setting the corresponding weighting coefficient $\lambda_i$ to zero.

High-SNR Recovery of Nanomaterial Chemistry

FIGS. 1A-1C demonstrate high-SNR chemical imaging results using fused multi-modal electron microscopy techniques herein from EDX signals of commercial cobalt sulfide (CoS) nano-catalysts used in oxygen-reduction applications—a unique class of transition metal sulfides with the highest activity among all chalcogenides of non-precious metals [20]. FIG. 1A illustrates a schematic 100 of a multi-model electron microscopy model that links the two modalities (EDX 102 and ADF 104) simultaneously collected in the electron microscope, in accordance with an example. In the schematic 100, the linked ADF modality 104 and EDX modality 102 generate signals of collected data in the microscope for every probe position. The techniques herein link and correlate the data between the two signals through an optimization process that produces chemical maps with higher SNRs.

FIGS. 1B-1E illustrate example chemical map data demonstrating advantageous output of the schematic 100. The low detection rate for characteristic X-rays is due to minimal emission and collection yield (see, e.g., Schlossmacher, P., Klenov, D., Freitag, B. & von Harrach, H. Enhanced Detection Sensitivity with a New Windowless XEDS System for AEM Based on Silicon Drift Detector Technology. Microsc. Today 18, 14-20 (2010)). For high-resolution EDX, the low count rate yields a sparse chemical image dominated by shot noise, as shown in the example of FIG. 1B which provides EDX chemical maps for S, Co, and O. FIG. 1C shows a simultaneous ADF micrograph of the CoS nanoparticle. However, noise in the fused multi-modal chemical map applying the present techniques is virtually eliminated (see, FIG. 1D) and allows for recovering chemical structure without a loss of resolution—including the interface of the nanoparticle core and the oxide shell (FIG. 1E). FIG. 1E illustrates the overlay map of the Co, S, and O chemical maps shown in FIG. 1D produced by the present techniques. The chemical maps produced by fused multi-modal EM quantitatively agreed with the expected stoichiometry—the specimen core contained a relative concentration of 39±1.6%, 42±2.5% and 13±2.4% and exterior shell composition of 26±2.8%, 11±2.0%, 54±1.3% for Co, S, O respectively. These estimates for core-shell concentrations are robust and remain consistent at lower doses $\sim 10^4$ e/Å$^2$.

In various examples, the fused multi-modal electron microscopy techniques herein are able to accurately recover chemical and electronic structure down to atomic length scales for EELS spectroscopic signals, as shown in FIGS. 2A-2E. FIG. 2A illustrates a multi-modal electron microscopy schematic 200 having an ADF modality 202 and a linked EELS modality 204 Unlike the EDX background which emerges from Bremsstrahlung radiation, EELS sits on a noise floor arising from inelastic scattering by all electrons whose binding energy is less than the edge. EELS characteristic features are core-loss edges spread over an extended energy range, making it less visible than sharp peaks in EDX spectrums.

EELS derived chemical maps for $Co_{3-x}Mn_xO_4$ high-performing super-capacitor nanoparticles (x=1.49) are substantially improved by multi-modal electron microscopy schematic 200 in FIG. 2A. The composite Co—Mn oxide examined in FIGS. 2B-2E was designed to achieve a synergy between cobalt oxide's high specific capacitance and manganese oxide's long life cycle. While the $Co_{3-x}Mn_xO_4$ nanoparticle appears chemically homogeneous in the ADF projection image along the [100] direction (as shown in FIG. 2C), core-shell distinctions are hinted at in the raw EELS maps (FIG. 2B). Specifically, these nanoparticles contain a Mn-rich center with a Co shell and homogeneous distribution of O. However the raw EELS maps are excessively degraded by noise preventing additional analysis beyond characterizing the basic morphology of the specimen. Yet, using the present techniques, the multi-modal reconstructions (shown in FIG. 2D) confirms that the Co-rich shell is crystalline and maps the Co/Mn interface in greater detail (as shown in the EELS overlay map of FIG. 2E). Because the ADF lacks contrast from oxygen scattering, the resulting map is featureless and benefits mostly from regularization.

The fused multi-modal electron microscopy techniques herein can be applied to generated chemical maps of molecules across different applications. FIGS. 3A-3E provide results of an example fused multi-modal electron microscopy process performed at atomic resolution on copper sulphur heterostructured nanocrystals with zinc sulfide caps with potential applications in photovoltaic devices or battery electrodes. The copper sulfide properties are sensitive to the Cu—S stoichiometry and crystal structure at the interface between ZnS and $Cu_{1.81}S$. FIG. 3 shows high-resolution ADF image data (FIG. 3C) and EELS image data (FIG. 3A) of a heterostructure CuZnS interface. Fused multi-modal electron microscopy of the present techniques maps out the atomically sharp $Cu_{1.81}S$—ZnS interface (FIG. 3B) and reveals step edges between the two layers as evidenced from the overlay (FIG. 3D). The labeled points on the RGB chemical overlay (FIG. 3D) shows the chemical rations produced by multi-modal EM for the CuS and ZnS regions—values which are consistent with the reported growth conditions.

Inspecting convergence for components in the cost function is a sufficient method to assess selection of hyperparameters. The data fidelity component (middle plot) and regularization component (bottom plot) and the model term (top plot) each should asymptotically converge to a value. This occurs because the data fidelity and model-based terms compete slightly as the algorithm finds an acceptable balance.

Quantifying Chemical Concentration

Extracting the ratio of atomic concentrations directly from EELS/EDX spectral maps is challenging and is most often limited to reporting single elements. The ratio of atomic concentrations is calculated from the ratio of scattering cross section against core-loss intensity. Accurate knowledge of all experimental parameters (e.g. beam energy, specimen-thickness, collection angles) and accurate calculation of the inelastic cross-section typically provides errors roughly between 5-10%. Cross-sections can be measured experimentally with a standard specimen of known thickness and stoichiometry or estimated theoretically by the Hartree-Slater model. EDX similarly is unable to extract relative concentrations without a calibration specimen. Relative intensities of EDX peaks depends on the detector, addressed by the k-factor method. To achieve an accuracy better than 15%, appropriate k-factors needs to be measured for each analyzed element, using test specimens of known composition with the same detector and microscope.

Fused multi-modal electron microscopy can produce stoichiometricly meaningful chemical maps from relative concentration maps alone—without specific knowledge of inelastic cross sections. The ratio of pixel values in the reconstructed maps directly corresponds to an elements concentration. FIGS. 4A-4C highlight pixel intensity histograms from concentration maps gathered from experimental EDX datasets and simulated materials. We experimentally demonstrate quantifiable recovery on metal oxide thin films with known stoichiometry: NiO (FIG. 4B) and $ZrO_2$ (FIG. 4A). FIG. 4D illustrates convergence plots for the three components of the cost function: (re) the model based term, (blue) data fidelity term, and (green) regularization term.

To assess stoichiometry of the present techniques, we generated a histogram of intensities from the chemical maps and fit a Gaussian distribution to determine the average concentration. The CoS nanoparticle (the sample material in FIG. 1A) required a tri-modal distribution to account for the two unique core-shell phases and the intermediate boundary. The datasets highlighted in FIGS. 4A-4D followed a single Gaussian distribution where the Zr, Ni, and Ga concentrations were centered about 35±5.8% and 50±2.9%. In both cases, the average Ni and Zr relative concentration was approximately equivalent to the expected ratio from the crystal stoi-chiometry: 33% and 50%.

We further validated stoichiometric recovery on a synthetic gallium oxide thin film (FIG. 4C). Chemical projections of two overlapping Ga and O thin films of equal thicknesses containing concentrations directly proportional to the crystal's stoichiometry ($Ga_2O_3$) is provided. The simulated ADF signal is proportional to $(\Sigma_i x_i Z_i)^\gamma$ where $x_i$ is the concentration for element i and $Z_i$ is the atomic number. As shown by the histogram, the simulated results agree strongly with the prior knowledge and successfully recovers the relative Ga concentration. The Gaussian distribution is centered about 40±0.4% when the ground truth is 40%.

In the illustrated example, the overall quantitative conclusions are slightly sensitive to selection of convergence parameters. The algorithm is stable and incorrect selection of hyperparameters could result in deviation of ±6% from the correct prediction in stoichiometry. Assessment of parameter selection can be determined by the convergence plots (FIG. 4D). Empirically we see the three components exhibits similar descents to the ZnS—$Cu_{1.81}S$ interfacial specimen in FIG. 3E.

Influence of Electron Dose

Figure 5B:
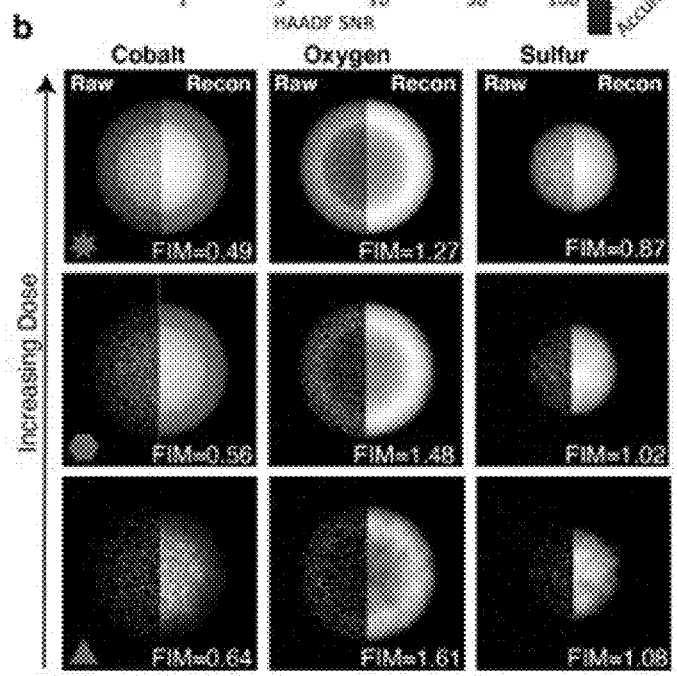
FIG. 5B is a visualization of three points on the phase diagram of FIG. 5A corresponding to increasing ADF/chemical electron does.
Figure 5C:
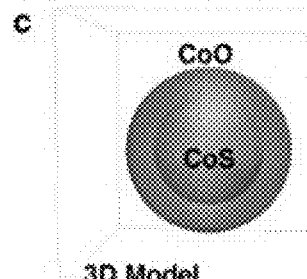
FIG. 5C illustrates the 3D model used to generate synthetic chemical projections and ADF.
Figure 5D:
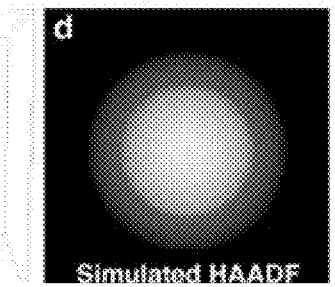
FIG. 5D is a visualization of a simulated ADF with high electron dose (having an SNR of approximately 20).

To further examine the accuracy of fused multi-modal electron microscopy at low doses, we performed a quantitative study of the root mean square error (RMSE) using a simulated 3D core-shell nanoparticle (sulfur core, cobalt oxide shell). FIGS. 5A and 5B show the simulation results as a function of the ADF and chemical modality's SNR. FIG. 5A is a phase diagram representing the reconstruction error as a function of multiple spectroscopic and ADF SNR. Brighter pixels denote results containing the incorrect concentrations from the ground truth. FIG. 5B is a visualization of three points on the phase diagram corresponding to the increasing ADF/chemical electron dose. The input images were generated by linear projections of the 3D chemical compositions, highlighted in FIG. 5C. In order to compare the algorithms at different noise levels, we scaled the intensities of the ground truth images to different average electron counts per pixel before applying random Poisson noise. This simulates the usage of different beam currents and dwell times, resulting in different electron doses. We evaluated image quality by measuring the root-mean-square error of the reconstructed relative concentration maps against the ground truth.

Overall the phase diagram (FIG. 5A) shows the core-shell nanoparticle chemical maps are accurately recovered at low-doses (ADF SNR>~4 and spectroscopic map SNR>~2) however becomes less accurate at extremely low doses. The map for multimodal reconstruction shows a predictably smooth degradation in recovery as the measured signals diminish. Examples of Poisson noises of simulated images can be found in FIG. 5B. The Co map closely mirrors the Z-contrast observed in ADF simply because it is the heaviest element present. Usually researchers will perform spectroscopic experiments within the top right corner separated by the red-dashed line, which for this system, would provide extremely accurate recovery.

Although we found fused multi-modal chemical mapping quite stable for larger nanoscale objects, in some examples, atomic-resolution multi-modal reconstructions may be challenged by spurious atom artifacts which require attention. Noise structure present in the raw maps may persist in the reconstruction and can be mistaken as potential lattice sites, especially if its position is overlapping with atoms visible in the ADF. Amorphous elements can be mischaracterized as crystalline or fake atoms could misidentified as interstitial defects. Thus, in various examples, the techniques herein may deploy one of two methods for resolving the spurious atoms possibility: (1) bin the data in Fourier Space and retain an area shorter than the first-order Brag Peaks, or (2) implement a multi-resolution reconstruction. Reconstructing the data in a lower resolution space not only reduces the computational complexity but also enhances the robustness of the optimization. The coarse reconstruction makes the process less sensitive to local properties and initially prioritizes redundant information at lowest spatial frequencies prior to handling periodic features.

In other example implementations, the fused multi-modal electron microscopy can recover missing core-edges in cases where there is anticorrelation between a chemical map and ADF. For instance, using the present techniques, we were able to recover the Br/Sr distribution for a charged ordered man-ganite $Bi_{0.35}Sr_{0.18}Ca_{0.47}MnO_3$ (BSCMO) system by anti-correlating the Ca distribution from the heavier atomic columns (A-sites) in the ADF.

Examples of multi-modal recovery may further include the following.

In an example electron spectroscopy experiment, a focused beam was raster scanned over the sample. ADF and EELS signals were collected measuring the number of scattered electrons within a specific annular range, while EDX spectrums recorded emitted characteristic X-rays at each probe position. EELS and EDX signals approximately measured the density of each element for each beam position while ADF provided a weighted sum of all elements. Mathematically this relationship can be described as follows: $\Sigma_i x_i = Ax$, where the summation from our physics-based model can be approximated with matrix-vector multiplication (A).

For measured chemical signals at low count rates the Poisson statistics deviate from a Gaussian approximation. Hence, from a Bayesian perspective, the data discrepancy is the Kullback-Leibler divergence, which is equivalent to the maximum negative log-likelihood under a Poisson noise assumption. In the case of large mean number of counts (high SNR), the Poisson distribution converges towards a Gaussian. Thus, provided that the chemical modality's SNR is high, we can take the Gaussian approach and replace the data-consistency term with least squares.

In some examples, the multi-element spectral variables may concatenated as a single vector: x, b∈ $\mathbb{R}^{n_x n_y n_i}$ where $n_i$ represent the number of elements being reconstructed. Overall, the inverse problem can equivalently be expressed in the following forms $\hat{x} = \arg\min_x \psi_1(x) + \psi_2(x) + TV(x)$ where $\hat{x}$ is the final reconstruction, $$\Psi_1 = \frac{1}{2}\|b_H - Ax^\gamma\|_2^2$$

is the physics model term, $\psi_2 = x - b\log(x)$ maintains self-consistency and TV regularizes the chemical maps. The solution would be unique because the first two terms (quadratic function and negative log-likelihood) are strictly convex and TV is convex.

In some examples, the optimization problem is solved by first-order gradient descent with an inner minimization stage to reduce the channel wise isotropic total variation. We solve this cost function by descending along the gradient directions for the first two terms and using Fast Gradient Projection method [39] to denoise the chemical maps.

$$\nabla_x \Psi_1(x) = -\gamma \text{diag}(x^{\gamma-1})A^T(b_H - Ax^\gamma)$$

$$\nabla_x \Psi_2(x) = 1 - \frac{b}{x}$$

The descent parameter for the model term ($\psi_1$) can be estimated from Lipschitz continuity: $L_{\psi_1} \leq \|A\|_1 \|A\|_\infty = n_{ch}$. Alternatively, the Poisson log-likelihood ($\Psi_2$) does not contain a Lipschitz-continuous gradient and its descent parameter cannot be pre-computed [40], which therefore requires a heuristic approach to determine.

Electron Microscopy

In an example, simultaneously acquired EELS and ADF datasets were collected on a 5th order aberration-correction Nion UltraSTEM microscope operated at 100 keV with a probe semi-angle of roughly 30 mrad and collection semi-angle of 80-240 mrad and 0-60 mrad for ADF and EELS, respectively. Both specimens were imaged at 30 pA, for a dwell time of 10 ms (FIG. 3) and 15 ms (FIG. 2) receiving a total dose of $3.25 \times 10^4$ and $7.39 \times 10^4$ e/Å$^2$. The EELS signals were obtained by integration over the core loss edges, all of which were done after background subtraction. The background EELS spectrum were modeled using a linear combination of power laws implemented using the open-source Cornell Spectrum Imager software.

Simultaneously acquired EDX and ADF datasets were collected on a FEI Titan at 200 keV. The CoS specimen was imaged at 100 pA and 40 us dwell time for 50 frames receiving a total dose of approximately $2.01 \times 10^5$ e/Å$^2$. The initial estimates for the EDX maps are generated with commercial Velox software.

Figure 6:
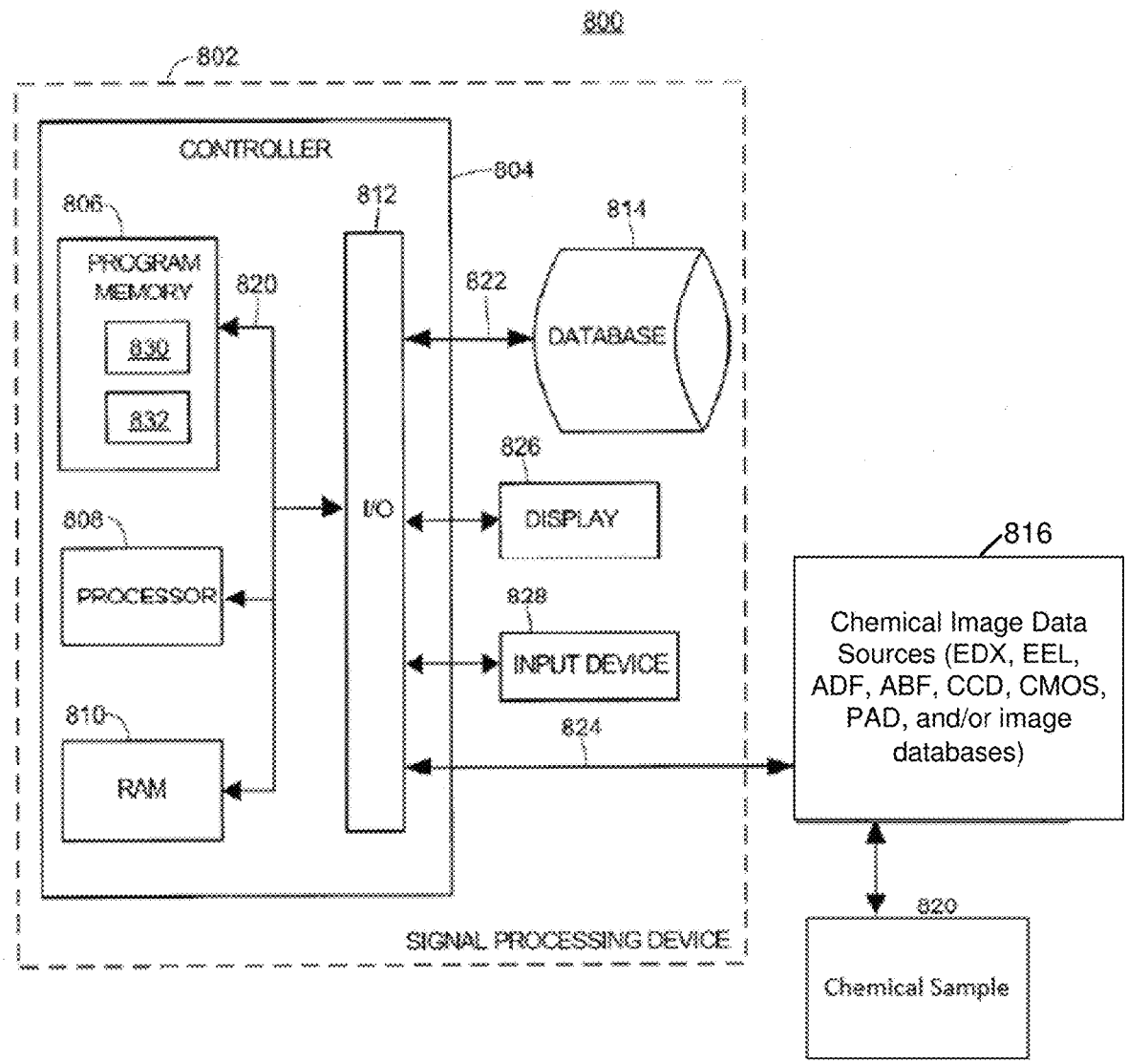
FIG. 6 is a schematic illustration of a multi-modal electron microscopy system, in accordance with an example.

The methods herein may be implemented by a signal-processing device, an example of which is shown in FIG. 6, illustrating a block diagram schematic 800 of various components used in implementing an example embodiment of the processes and methods discussed herein. In an example, the schematic 800 is of a multi-modal electron microscopy system. A signal-processing device 802 (or "signal processor") may be coupled to a chemical sample 820 via one or more image data sources 816 (for example EDX, EELS, ADF, ABF, CCD, CMOS, PAD, or image database image sources) in accordance with executing the functions of the disclosed embodiments. The image data source 816 may be captured images from an electron microscope. Indeed, in some examples, the system 800 is implemented as an electron microscope and the image data source 816 contain image data captured, from the different capture modalities described, of the sample 820.

The signal-processing device 802 may have a controller 804 operatively connected to the database 814 via a link 822 connected to an input/output (I/O) circuit 812. It should be noted that, while not shown, additional databases may be linked to the controller 804 in a known manner. The controller 804 includes a program memory 806, one or more processors 808 (may be called microcontrollers or a microprocessors), a random-access memory (RAM) 810, and the input/output (I/O) circuit 812, all of which are interconnected via an address/data bus 820. It should be appreciated that although only one processors 808 is shown, the controller 804 may include multiple microprocessors 808. Similarly, the memory of the controller 804 may include multiple RAMs 810 and multiple program memories 806. Although the I/O circuit 812 is shown as a single block, it should be appreciated that the I/O circuit 812 may include a number of different types of I/O circuits. The RAM(s) 810 and the program memories 806 may be implemented as semiconductor memories, magnetically readable memories, and/or optically readable memories, for example. A link 824, which may include one or more wired and/or wireless (Bluetooth, WLAN, etc.) connections, may operatively connect the controller 804 to one or more image data capture systems 816 through the I/O circuit 812. The image data capture systems 816 may be positioned to capture image data for the chemical sample 820.

The program memory 806 and/or the RAM 810 may store various applications (i.e., machine readable instructions) for execution by the processor 808. For example, an operating system 830 may generally control the operation of the signal-processing device 802 and provide a user interface to the signal-processing device 802 to implement the process 100 described herein. The program memory 806 and/or the RAM 810 may also store a variety of subroutines 832 for accessing specific functions of the signal-processing device 802. By way of example, and without limitation, the subroutines 832 may include, among other things: a subroutine for performing the processes and methods described herein, including the minimization and optimization processes herein including those of FIGS. 7 and 10. The subroutines 832 may also include other subroutines, for example, implementing software keyboard functionality, interfacing with other hardware in the signal-processing device 802, etc. The program memory 806 and/or the RAM 810 may further store data related to the configuration and/or operation of the signal-processing device 802, and/or related to the operation of the one or more subroutines 832. In addition to the controller 804, the signal-processing device 802 may include other hardware resources. The signal-processing device 802 may also include various types of input/output hardware such as a visual display 826 and input device(s) 828 (e.g., keypad, keyboard, etc.). In an embodiment, the display 826 is touch-sensitive, and may cooperate with a software keyboard routine as one of the software routines 832 to accept user input. It may be advantageous for the signal-processing device 802 to communicate with a broader chemical analysis networks (not shown) through any of a number of known networking devices and techniques (e.g., through a commuter network such as an hospital or clinic intranet, the Internet, etc.).

Although depicted as separate entities or components in FIG. 1, it is understood that any or the entire signal processing functionality and/or components of the signal-processing device 802 may be combined with an image data collection device, spectrometry, chemical analysis system, etc.

Figure 7:
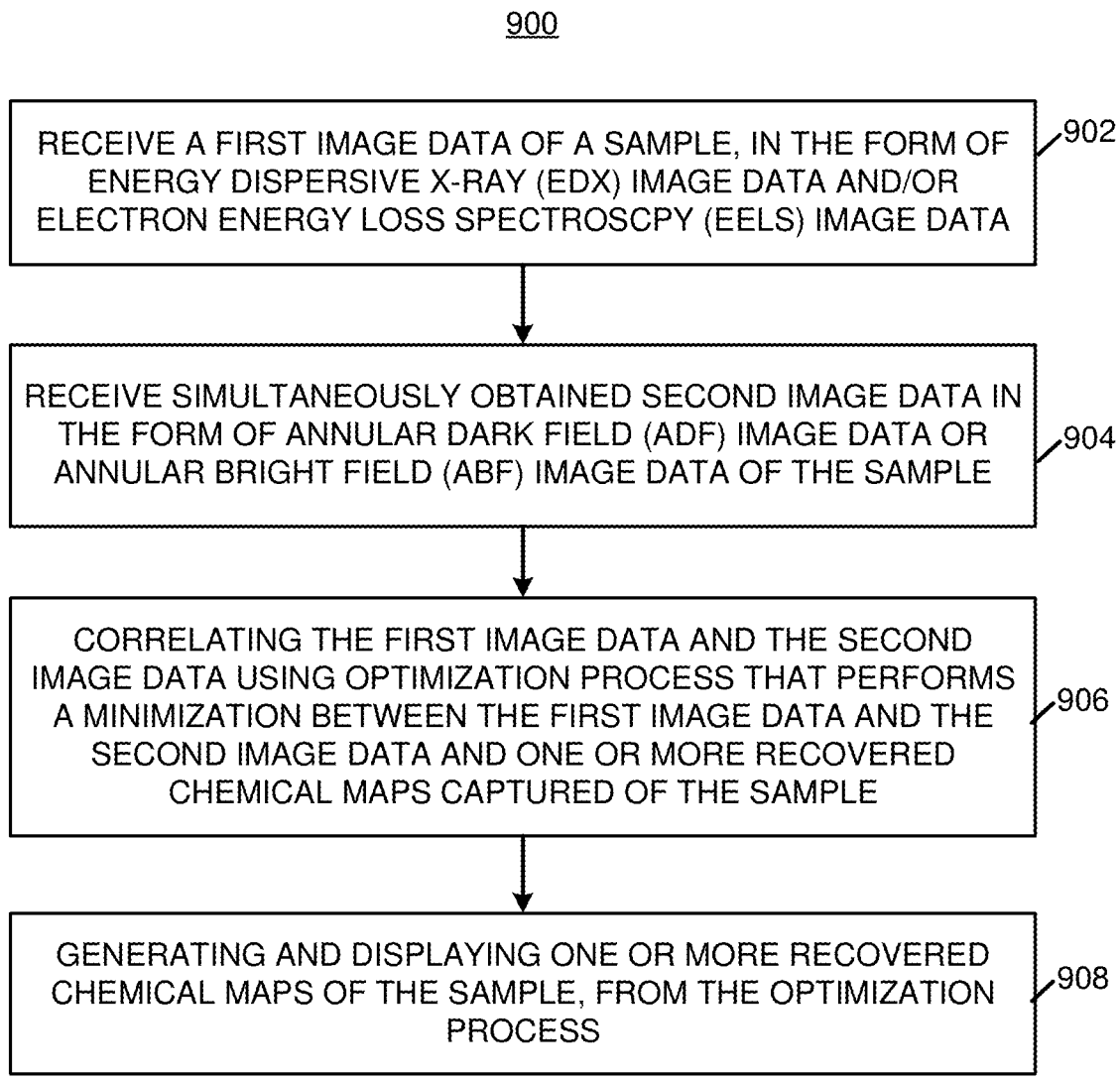
FIG. 7 illustrates a process for chemical sample imaging using the multi-modal electron microscopy system of FIG. 6, in accordance with an example.

FIG. 7 illustrates a process 900 for chemical sampling imaging using a fused multi-modal electron microscopy. At a block 902, image data of a chemical sample is received at the system 800, for example from the multi-modal image source 816. That image data may be EDX image data or EELS image data, in accordance with examples. This image data may contain one or more measured chemical maps. The image data at block 902 represents one modality type. At a block 904, image data from another modality type is obtained, in particular annular dark field (ADF) image data corresponding to the chemical sample. In some examples, the image data at block 904 has been simultaneously obtained to the image data at block 902. At a block 906, the image data of block 902 and the image data of block 904 are correlated using an optimization process that performs a minimization between the two image data and one or more recovered chemical maps captured of the sample. For example, the process 906 may correlated and optimize the received first and second image data, from blocks 902 and 904, respectively, by applying any of optimization Ex. 1, Ex. 2, or Ex 3 above. Although, any suitable optimization process that performs a minimization between each of the EDX/EELS image data and the ADF image data and one or more recovered chemical maps of the chemical sample may be used. At block 908, the fused multi-modal electron microscopy generates and/or displays one or more recovered chemical maps, in response to the optimization process of block 906. For example, the block 908 may generate recovered EDX or EELS maps of individual chemical constituents or an overlay, as shown in various examples herein including in FIGS. 1-3.

Multi-modal Electron Tomography

The fused multi-model electron microscopy techniques herein may also be used for electron tomography, providing a technique that offers high SNR and high-resolution recovery of material chemistry in three dimensions (3D) by leveraging correlated information encoded within both ADF or ABF and EDX/EELS. For example, we applied the present techniques to demonstrate fused multi-modal tomography on a simulated composite material system (see, FIG. 8A) formed of three elements (Ni, Co and O). The process virtually eliminated Poisson noise in the raw chemical tomograms (FIG. 8C) and efficiently recovered interior nanoparticles in the fused multi-modal reconstruction (as shown in FIG. 8D). Conventionally spectral maps were collected at every tilt; however we used a new sampling strategy that efficiently minimized dose by maintaining an asymmetric ratio (e.g. 1:5) between the number of ADF and chemical images (FIG. 1D). Although sparse chemical measurements are severely underdetermined in Fourier space (FIG. 1C), fusing the two modalities ultimately filled in missing information (FIG. 1D), improving resolution and reconstruction quality.

Further, we experimentally demonstrated fused multi-modal electron tomography on ZnS/CuS nanocrystals. The radiation sensitivity of the 20 nm nanoparticles makes it challenging to map the distribution ZnS and CuS rich phases in 3D. Despite the noisy EELS maps, the recovered chemical tomograms quality was substantially improved (FIGS. 9B and 9C) over traditional tomography as ~5-10 nm internal cavities and oxidized shells are clearly visible (FIG. 9A). These results demonstrate fused multi-modal tomography can substantially improve the quality and accuracy of chemical tomograms, even under minimal doses (e.g., ~$10^4$ e/Å$^2$).

Thus, as shown, the present techniques are able to recover 3D chemistry by solving an optimization problem that seeks a solution that strongly correlates with the (1) ADF modality, (2) chemically sensitive measurements and (3) is maximally sparse in the gradient domain. These three terms define our multi-modal approach to surpassing traditional dose limits. In various examples, the overall optimization problem, as provided above, for estimating chemical maps is the following:

$$\hat{x} = \operatorname*{argmin}_{x} \frac{\lambda_1}{2} \left\| A_h \sum_i (Z_i x_i)^\gamma - b_h \right\|_2^2 + \quad \text{(Eq. 4)}$$

$$\lambda_2 \sum_i (A_c x_i - b_i \log(A_c x_i)) + \lambda_3 \sum_i \|x_i\|_{TV}$$

where $b_h$ is the annular or pixelated detector image data across a range of specimen projection angles, $A_h$ and $A_c$ are forward projection operators for the annular detector image data and chemical maps, A are weighting coefficients, $b_i$ is the measured chemical image data across a range of specimen projection angles, and $x_i$ is the recovered chemical volume for element i, respectively. Yet another example optimization function is:

$$\operatorname*{argmin}_x \frac{\lambda_1}{2} \left\| A_h \sum_i (Z_i x_i)^\gamma - b_h \right\|_2^2 + \quad \text{(Eq. 5)}$$

$$\lambda_2 \|A_c x_i - b_i \log(A_c x_i)\|_2^2 + \lambda_3 \sum_i \|x_i\|_{TV}$$

where $b_h$ is the annular or pixelated detector image data across a range of specimen projection angles, $A_h$ and $A_c$ are forward projection operators for the annular detector image data and chemical maps, λ are weighting coefficients, $b_i$ is the measured chemical image data across a range of specimen projection angles, and $x_i$ is the recovered chemical volume for element i, respectively. In this way, fused multi-modal electron tomography opens a pathway to investigate 3D chemistry of nanomaterials by reducing total electron dose while maintaining high fidelity.

Figure 10:
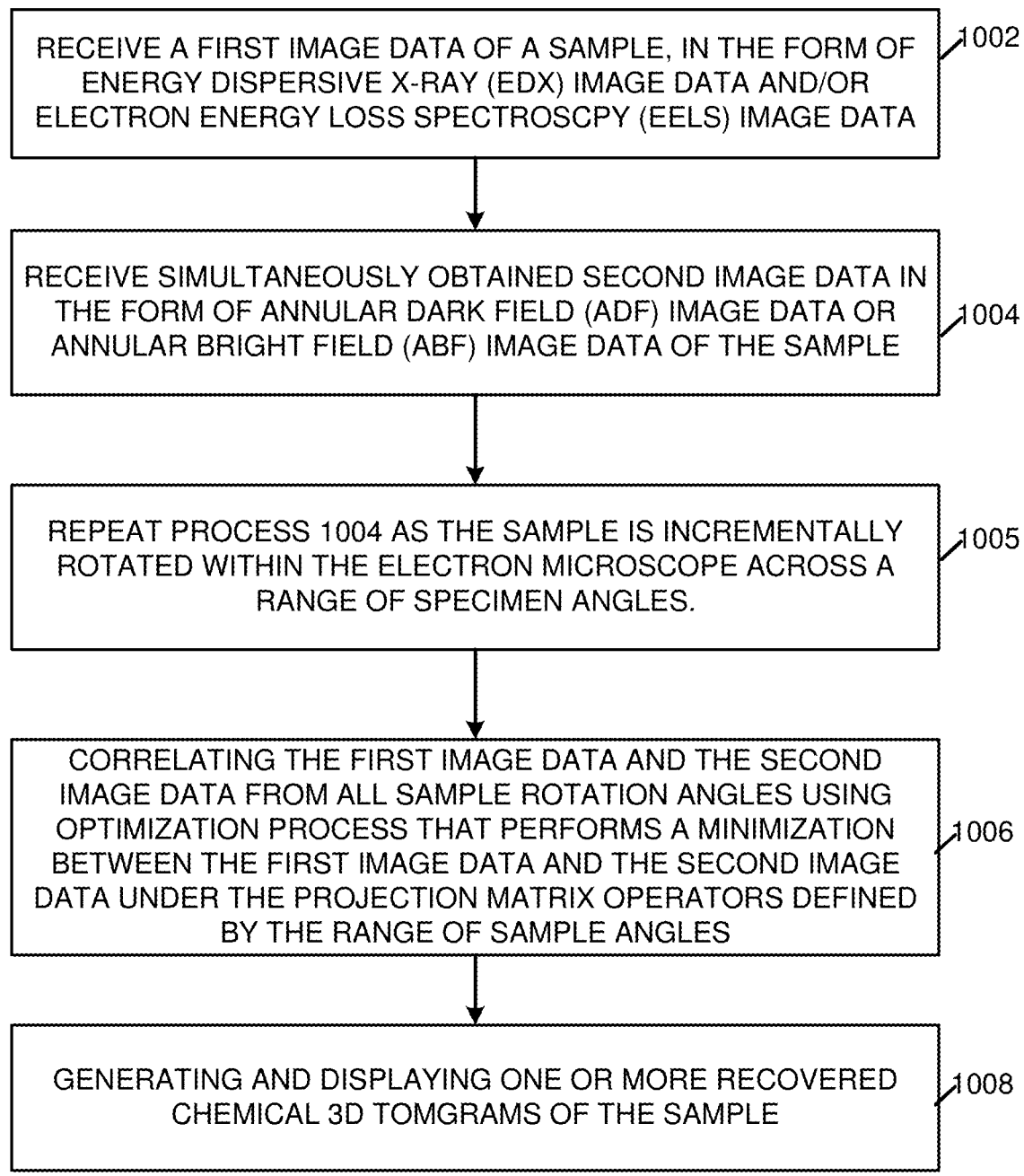
FIG. 10 illustrates a process for chemical 3D image reconstruction by fused multi-modal electron tomography using the multi-modal electron microscopy system of FIG. 6, in accordance with an example.

FIG. 10 illustrates a process 1000 for chemical 3D image reconstruction by fused multi-modal electron tomography using the multi-modal electron microscopy system of FIG. 6, in accordance with an example. At a block 1002, image data of a chemical sample is received at the system 800, for example from the multi-modal image source 816. That image data may be EDX image data or EELS image data. The image data at block 1002 may be collected at a specified rotation angle of the chemical sample. The image data at block 1002 contains a stack the multi-modal image data from source 816 corresponding to multiple discrete rotation angles of the specimen. At a block 1004, image data from another modality type is obtained, in annular detector (e.g., ADF or ABF) image data corresponding to the chemical sample. The image data at block 1004 may be simultaneously obtained to the image data at block 902. The image data at block 1002 contains a stack ADF image data for multiple discrete rotation angles of the specimen. Via a block 1005, the process of block 1004 and/or 1002 is repeated as the sample is incrementally rotated within the electron microscope across a range of sample angles. At a block 1006, the image data of block 1002 and the image data of block 1004 are provided to an optimization process that performs a minimization between the two image data and one or more recovered volumetric chemical maps are captured of the sample. In particular, the first image data and the second image data from all sample rotation angles are correlated using an optimization process that performs a minimization between the first and second image data under projection matrix operators defined by the range of sample angles. For example, the process 1006 may apply the minimization of Ex. 4 as the optimization process. At block 1008, the fused multi-modal electron microscopy generates and/or displays a 3D recovered chemical tomogram. For example, the block 1008 may generate a fused multi-modal chemical 3D tomogram as shown in FIG. 9B of the fused slice images of FIG. 9C.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as an example only and does not describe every possible embodiment, as describing every possible embodiment would be impractical, if not impossible. One could implement numerous alternate embodiments, using either current technology or technology developed after the filing date of this application.

What is claimed:

1. A method for chemical sample imaging, the method comprising:
   receiving energy dispersive X-ray (EDX) image data corresponding to a chemical sample, the EDX image data containing one or more measured chemical maps;
   receiving annular dark field (ADF) image data or annular bright field (ABF) or pixelated detector (PD) image data corresponding to the chemical sample;
   correlating the EDX image data and the ADF image data or the ABF or the PD image data using an optimization process that performs a minimization between each of the EDX image data and the ADF image data or the ABF image data and one or more recovered chemical maps of the chemical sample; and in response to the optimization process, generating and displaying and/or storing the one or more recovered chemical maps corresponding to the chemical sample.

2. A method for chemical sample imaging, the method comprising:

receiving electron energy loss spectroscopy (EELS) image data corresponding to a chemical sample, the EELS image data containing one or more measured chemical maps corresponding to the chemical sample;

receiving annular dark field (ADF) image data or annular bright field (ABF) or pixelated detector (PD) image data corresponding to the chemical sample;

correlating the EELS image data and the ADF image data or the ABF image data using an optimization process that performs a minimization between each of the EELS image data and the ADF image data or the ABF or PD image data and one or more recovered chemical maps of the chemical sample; and in response to the optimization process, generating and displaying and/or storing the one or more recovered chemical maps corresponding to the chemical sample.

3. The method of any of claim 1 or 2, wherein the optimization process comprises applying an optimization expression as follows:

$$\operatorname*{argmin}_{x} \frac{\lambda_1}{2} \left\| b_H - \sum_i (Z_i x_i)^\gamma \right\|_2^2 + \lambda_2 \sum_i (x_i - b_i \log(x_i)) + \lambda_3 \sum_i \|x_i\|_{TV}$$

where $b_H$ is the annular or pixelated detector image data, $\lambda_i$ and $\gamma$ are weighting coefficients, $b_i$ and $x_i$ are the measured chemical maps and recovered chemical maps, respectively, i is an element, $Z_i$ is a scaling factor, and TV is channel-wise total variation regularization.

4. The method of any of claim 1 or 2, wherein the optimization process comprises applying an optimization expression as follows:

$$\operatorname*{argmin}_{x} \frac{\lambda_1}{2} \left\| b_H - \sum_i (Z_i x_i)^\gamma \right\|_2^2 + \frac{\lambda_2}{2} \|b_i - x_i\|_2^2 + \lambda_3 \sum_i \|x_i\|_{TV}$$

where $b_H$ is the annular or pixelated detector image data, $\lambda_i$ and $\gamma$ are weighting coefficients, $b_i$ and $x_i$ are the measured chemical maps and recovered chemical maps, respectively, i is an element, $Z_i$ is a scaling factor, and TV is channel-wise total variation regularization.

5. The method of any of claim 1 or 2, wherein the optimization process comprises applying an optimization expression as follows:

$$\hat{x} =$$

$$\operatorname*{argmin}_{x} \frac{\lambda_1}{2} \left\| A_h \sum_i (Z_i x_i)^\gamma - b_h \right\|_2^2 + \lambda_2 \sum_i (A_c x_i - b_i \log(A_c x_i)) + \lambda_3 \sum_i \|x_i\|_{TV}$$

where $b_H$ is the annular or pixelated detector image data, $A_h$ and $A_c$ are forward projection operators for the annular detector image data and chemical maps, $\lambda$ and $\gamma$ are weighting coefficients, $b_i$ is the measured chemical image data across a range of specimen projection angles, and $x_i$ is the recovered chemical volume for element i, respectively, $Z_i$ is a scaling factor, and TV is channel-wise total variation regularization.

6. The method of any of claim 1 or 2, wherein the optimization process comprises applying an optimization expression as follows:

$$\operatorname*{argmin}_{x} \frac{\lambda_1}{2} \left\| A_h \sum_i (Z_i x_i)^\gamma - b_h \right\|_2^2 + \lambda_2 \|A_c x_i - b_i \log(A_c x_i)\|_2^2 + \lambda_3 \sum_i \|x_i\|_{TV}$$

where $b_H$ is the annular or pixelated detector image data, $A_h$ and $A_c$ are forward projection operators for the annular detector image data and chemical tilts, $\lambda$ and $\gamma$ are regularization parameters, $b_i$ and $x_i$ are the measured and recovered chemical maps for element i, respectively $Z_i$ is a scaling factor, and TV is channel-wise total variation regularization.

7. The method of any of claim 1 or 2, wherein the EDX image data comprises measured chemical maps of a plurality of different chemical compounds.

8. The method of any of claim 1 or 2, wherein the EELS image data comprises measured chemical maps of a plurality of different chemical compounds.

9. The method of any of claim 1 or 2, wherein generating and displaying and/or storing the one or more recovered chemical maps comprises: overlaying the measured chemical maps on the recovered chemical maps wherein the EDX image data comprises chemical maps of a plurality of different chemical compounds.

10. The method of any of claim 1 or 2, wherein the EDX image data or the EELS image data comprises a plurality of measured chemical maps and a plurality of recovered chemical maps are generated, the method further comprising:

determining a stoichiometric concentration of the chemical sample by comparing the plurality of recovered chemical maps to one another, of the plurality of recovered chemical maps corresponding to a different chemical composition; and determining a concentration of each of the different chemical compositions.

11. A method for chemical sample imaging, the method comprising:

receiving electron energy loss spectroscopy (EELS) image data and receiving energy dispersive X-ray (EDX) image data corresponding to a chemical sample, the EDX image data and the EELS image data containing one or more measured chemical maps corresponding to the chemical sample;

receiving annular dark field (ADF) and/or annular bright field (ABF) and/or pixelated detector (PD) image data corresponding to the chemical sample;

correlating the EELS image data, the EDX image data, and the ADF or the ABF or the PD image data using an optimization process that performs a minimization between each of the EELS image data and the EDX image data, and the ADF, the ABF, or the PD image data and one or more recovered chemical maps of the chemical sample; and in response to the optimization process, generating and displaying and/or storing the one or more recovered chemical maps corresponding to the chemical sample.

* * * * *